United States Patent [19]

Rott

[11] Patent Number: 4,694,862

[45] Date of Patent: Sep. 22, 1987

[54] VALVE FOR ATTACHMENT TO AN ACTUATING MEANS

[75] Inventor: Horst Rott, Mühlbach, Fed. Rep. of Germany

[73] Assignee: Mannesmann Rexroth GmbH, Lohr, Fed. Rep. of Germany

[21] Appl. No.: 837,413

[22] Filed: Mar. 7, 1986

[30] Foreign Application Priority Data

Mar. 15, 1985 [DE] Fed. Rep. of Germany ....... 3509479

[51] Int. Cl.⁴ .......................................... F15B 13/044
[52] U.S. Cl. ............................ 137/625.5; 137/625.27; 137/625.65; 137/901
[58] Field of Search ........... 137/625.27, 625.5, 625.65, 137/901, 625.69; 251/129.2, 244, 246, 363, 285

[56] References Cited

U.S. PATENT DOCUMENTS 2,630,135  3/1953  Johnson ..................... 137/625.69 X
3,163,175  12/1964  Pearson ..................... 137/625.69 X

FOREIGN PATENT DOCUMENTS 2939707  4/1981  Fed. Rep. of Germany .
2951232  7/1981  Fed. Rep. of Germany ........................ 137/596.17
3115674  1/1982  Fed. Rep. of Germany .
3110907  9/1982  Fed. Rep. of Germany .
868329  5/1961  United Kingdom ........... 137/625.27

Primary Examiner—Gerald A. Michalsky
Attorney, Agent, or Firm—Harness, Dickey & Pierce

[57] ABSTRACT

In a directional seat valve all the valve seat components disposed axially adjacent each other in the housing bore are held between two closure screws and for assembling the valve the movable valve elements are supported via the valve actuating pin on a punch. By turning the closure screws the valve seat components can be adjusted in the axial direction so that the actuating pin has a predetermined spacing with respect to the housing end side of the valve. An advantage resides in that in the assembly of the valve itself a constant dimension can be set between the actuating pin and the housing and consequently an adjustment on subsequent attachment to the actuating means dispensed with, in particular an adjustment of the actuator cooperating with the actuating pin.

9 Claims, 2 Drawing Figures

VALVE FOR ATTACHMENT TO AN ACTUATING MEANS

The invention relates to a valve for attachment to an actuating device having the features set forth in the preamble of claim 1.

Such valves are known (Rexroth Type SE..U or Type SE..C). These are directional seat valves whose seat elements are formed as balls which are pressed via a tappet by a spring onto the valve seat. The actuation is by an outwardly projecting actuating pin which is displaced by an electrically actuated means via an actuator, in particular a pivotal deflection lever. The valve seat components are clamped between a housing stop and a closure screw. The actuating pin is sealed by means of seals.

Since due to production tolerances in the manufacture of the valve components and on assembly of the valve the axial position of the actuating pin is different in each case, the actuator comprises an adjustment screw for compensating the various axial dimensions on attachment of the actuating means. The adjustment of the valve thus takes place on attachment of the actuating means.

The problem underlying the invention is to simplify the assembly of such a valve and its adjustment as far as possible.

Said problem is solved according to the invention by the features set forth in the characterizing clause of claim 1.

The entire axis of the valve, i.e. the displaceable valve elements with the valve seat components lying adjacent each other replaceably in the housing bore, can be displaced with respect to said housing bore when the closure screws on either side are appropriately turned. For adjustment by turning the closure screws the valve axis is displaced until the actuating pin has a predetermined spacing from the reference plane. In this alignment the valve seat components are braced by applying a tightening moment to the closure screw opposite the actuating pin. Subsequent adjustment is not necessary. Consequently, the actuator cooperating with the actuating pin has no adjustment facility and the assembly with the actuating means is considerably simplified.

Advantageous further developments of the invention are set forth in the subsidiary claims.

If the bore of the second closure screw through which the actuating pin extends outwardly is provided with a form-locking face, in particular an internal hexagon, by means of the punch provided with a corresponding external hexagon the closure screw can be turned. The punch forms then both the support face for the actuating pin and a means for turning the closure screw and thus adjusting the valve axis. In addition, the punch can be pressed by a spring against the actuating pin so that the seat element lifts off and the adjustment is carried out with the travelled stroke of the seat element so that tolerances of the valve stroke are also eliminated.

In particularly advantageous manner the opening of the second closure screw is sealed with an insert in which the seals for sealing the actuating pin with respect to the outside are provided. The seals can thus be easily replaced without changing the adjustment of the valve.

An example of embodiment of the invention will be explained in detail hereinafter with the aid of the drawings, wherein.

Figure 1:
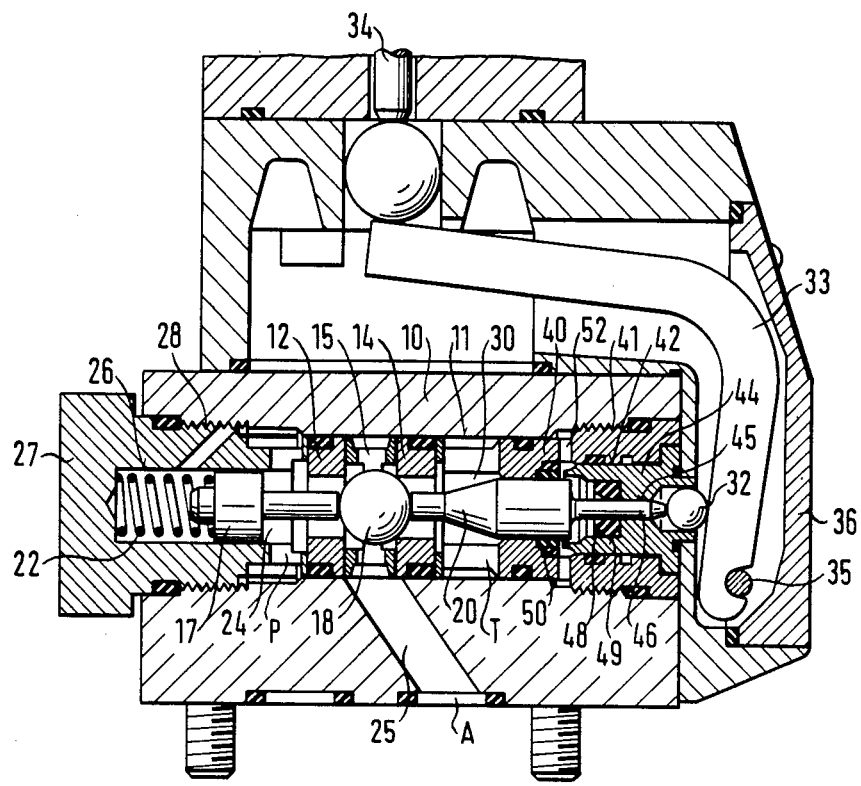
FIG. 1 is a section through a three-way/two-position valve.

In a housing bore 11 of a valve housing 10 of a three-way/two-position seat valve a plurality of valve seat components 12, 14, 15 are arranged axially adjacent each other and within said valve seat components the movable valve elements 17, 18 and 20. The seat element 18 is a ball which in the starting position is pressed by a spring 22 onto the valve seat body 14, whereby the pressure chamber 24 of the valve connected to a pump P is connected to the passage 25 leading to a consumer A. The tappet 17 and the spring 22 are disposed in a bore 26 of a closure screw 27 which is screwed into an internal thread 28 of the housing bore.

Switching of the valve is by displaying the actuating pin 20 which acts on the seat element 18 and displaces the latter against the force of the spring 22 so that the passage 25 leading to the consumer is connected to the valve chamber 30 which comprises a connection to the tank T. The displacement of the actuating pin 20 is via a ball 32 and a deflection lever 33 which is pivotal by the tappet 34 of an actuating means not shown in detail about the pin 35 fixed with respect to the housing. The lever 33 is disposed in an adapter housing 36 to which the actuating means is screwed.

On the side of the actuating pin 20 a second closure screw 40 is screwed to an internal thread 41 of the housing bore 11. The closure screw 40 comprises a bore 42 through which the actuating pin 20 extends outwardly to the ball 32. The bore 42 of the closure screw 40 is sealed with an insert 44 which in turn comprises a bore 45 for the extension 46 of the actuating pin 20 and a packing seal 48 in a blind bore 49 of the insert 44 and a further packing seal 50 disposed between the insert 44 and the closure screw 40. The blind bore 49 of the insert 44 is connected via a passage 52 to the pressure chamber 24 so that pressure equalization at the actuating pin 20 is achieved without having to overcome on actuation of the valve the pressure force acting via the seat area.

On withdrawal of the insert 44 the seals 48 and 50 are also accessible and can easily be replaced.

Before the actuating means with the adapter housing 36 and the actuator 33 are secured to the valve housing 10 the valve axis is adjusted. For this purpose all the valve seat components 12, 14, 15 and displaceable valve elements 17, 18, 20 are arranged in the housing bore between the closure screws 27 and 40. The insert 44 has not yet been inserted.

Figure 2:
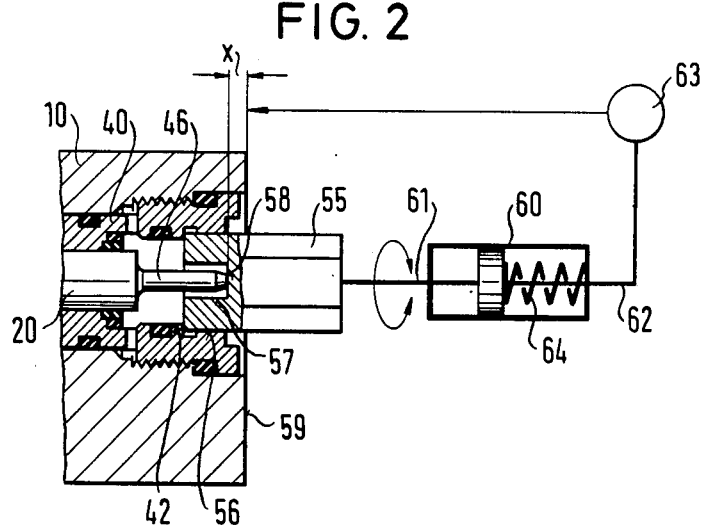
FIG. 2 shows a punch introduced into the second closure screw for adjusting the valve axis.

As apparent from FIG. 2 a punch 55 engages in the bore 42 of the second closure screw 40 and cooperates in form-locking manner with the closure screw via a hexagon 56. On turning the punch 55 the closure screw 40 is thus entrained and also turned. The punch 55 further comprises a depression 57 into which the extension 46 of the actuating pin 20 engages. In FIG. 2 the punch 55 can be brought into the working position by a hydraulically actuated cylinder 60. The piston rod 61 of the cylinder 60 is extended at 62 and actuates a gauge 63 which has a predetermined distance from the housing end side 59. The gauge 63 thus displays the distance x. The force of the spring 64 in the cylinder 60 must be greater than the force of the valve spring 22 so that the punch 55 raises the seat element against the force of the spring 22 and applies it to the ring 12.

In this position by turning the two closure screws 27 and 40 all the valve seat components 12, 14, 15 and movable valve elements 17, 18, 20, i.e. the entire valve axis or stem together with the punch 55, can be adjusted axially in the housing bore 11 of the valve until the support surface 58 at the punch 55 for the actuating pin has a predetermined dimension x with respect to the end side 59 of the valve housing 10. The adjustment is thus completed and a tightening torque is applied to the closure screw 27 to clamp the valve seat components together in the housing bore. The punch 55 serves for blocking the closure screw 40 via the hexagon 56 so that said screw cannot move.

The valve can thus be assembled completely. It no longer requires any adjustment by corresponding adjustment of the lever 33. The production of such valves is thus considerably simplified. The adjustment of directional seat valves having a plurality of seat elements is in corresponding manner.

What is claimed:

1. Valve for attachment to an actuating means comprising a housing defining a bore, a plurality of separate valve seat components arranged axially adjacent each other in said housing bore and clamped between a closure screw screwed to an internal thread of said housing bore and a stop, and valve elements consisting at least of a valve body cooperable with oppositely facing valve seats formed on certain of said valve seat components and an actuating pin displaceable axially with respect to said valve seat components, said actuating pin extending outwardly through said housing bore and being sealed by means of at least one seal with respect to the housing bore, said actuating pin cooperating with an external actuator, characterized in that said stop for the valve seat components is formed by a second closure screw screwed into an internal thread at the other end of said housing bore and freely adjustable in an axial direction for adjusting the spacing between a reference plane of said valve housing, said actuating pin and said valve seat components by turning the two closure screws.

2. Valve according to claim 1, characterized in that a bore provided in the second closure screw, said second closure screw bore receiving an insert sealingly engaged with said actuating pin.

3. Valve according to claim 2, characterized in that the seal for sealing the actuating pin are arranged between the actuating pin and the insert and between the actuating pin and the second closure screw and held by the insert.

4. Valve according to claim 1, characterized in that the reference plane is one housing end side of the valve.

5. Valve according to claim 1, characterized in that the second closure screw has a polygonal shaped surface adapted to be engaged by a complimentary surface of a punch for rotation of said second screw.

6. Valve according to claim 5, characterized in that the closure screw is provided with a bore provided with an internal hexagon into which an external hexagon punch is insertable.

7. Valve according to claim 6, characterized in that the adjustment is carried out with the valve body in an opened position.

8. Valve according to claim 6, characterized in that the valve seat components are biased with the punch inserted by turning the opposite closure screw.

9. Valve according to claim 1, characterized in that the connection of the actuating pin to the external actuator is via a lever.

* * * * *

UNITED STATES PATENT AND TRADEMARK OFFICE
CERTIFICATE OF CORRECTION

PATENT NO. : 4,694,862

DATED : September 22, 1987

INVENTOR(S) : Horst Rott

It is certified that error appears in the above-identified patent and that said Letters Patent is hereby corrected as shown below:

Column 2, line 20, "displaying" should be --displacing--.

Column 4, line 12, Claim 3, "seal" should be --seals--.

Column 4, line 21, Claim 5, "complimentary" should be --complementary--.

Signed and Sealed this

Tenth Day of May, 1988

Attest:

DONALD J. QUIGG

*Attesting Officer*

*Commissioner of Patents and Trademarks*